United States Patent [19]

Hamar

[11] Patent Number: 4,679,940
[45] Date of Patent: Jul. 14, 1987

[54] CONTROL SYSTEM FOR A CONTINUOUS CELL TARGET READOUT IN A LASER MEASUREMENT SYSTEM

[76] Inventor: Martin R. Hamar, 118 Old Ridgefield Rd., Wilton, Conn. 06897

[21] Appl. No.: 636,835

[22] Filed: Aug. 1, 1984

[51] Int. Cl.[4] .............................................. G01B 11/14
[52] U.S. Cl. ..................................... 356/375; 356/400; 250/203 R
[58] Field of Search .............. 356/1, 376, 400, 203 R; 250/203 R

[56] References Cited

U.S. PATENT DOCUMENTS

| | | | |
|---|---|---|---|
| 3,679,307 | 7/1972 | Zoot et al. ............................... | 356/1 |
| 3,744,913 | 7/1973 | Farthins et al. .................. | 250/203 R |

OTHER PUBLICATIONS

"An Experimental Canopus Star Sensor" Haskell Agard Conference Proceedings #87 May 31-Jun. 4, 1971.

*Primary Examiner*—R. A. Rosenberger
*Assistant Examiner*—Crystal D. Cooper
*Attorney, Agent, or Firm*—Anthony J. Casella; Gerald E. Hespos

[57] ABSTRACT

A control system for processing the signals sensed by a continuous cell target in a laser measurement system is disclosed involving electronic circuitry and components for indicating incidence of the beam on the target, for shifting the electrical sensing center of the cell to the center of the target housing, and for compensating for variations in laser beam intensity.

7 Claims, 6 Drawing Figures

FIG.5

SEQUENCE COUNTER 122
STATE LISTING

| COUNT STATE | FUNCTION ENABLED |
|---|---|
| 0 | DONE/READY |
| 1 | SIGN |
| 2 | DECIMAL PT. |
| 3 | DIGIT 1 (MOST SIGNFICANT) |
| 4 | DIGIT 2 |
| 5 | DIGIT 3 |
| 6 | DIGIT 4 (LEAST SIGNFICANT) |
| 7 | CARRIAGE RETURN |
| 8 | LINE FEED |

CONTROL SYSTEM FOR A CONTINUOUS CELL TARGET READOUT IN A LASER MEASUREMENT SYSTEM

BACKGROUND

The present invention relates to laser measurement systems and more particularly to a system for controlling the electronic readout of a continous cell target used in such measurement systems to facilitate calibration.

Laser measurement systems are finding increasing use in the squaring and alignment of machine components and construction elements, as well as in distance measurement and related applications, since the nature of the laser beam makes it particularly suitable for defining straight lines and for being accurately detected by light sensitive targets, thus rendering it capable of providing highly precise measurements. The accuracy of such measurements, however, is limited by the capability of the sensing is provided to readily indicate whether or not the laser beam is incident on any point on the target face.

SUMMARY OF THE INVENTION

The present invention is directed to simplifying the calibration and use of continuous cell targets in laser measurement systems and involves the provision of electronic means that automatically compensate for variations in the intensity and spot size of the laser beam sensed by the cell, and that permit the "zeroing" of the sensing center of the target on the exact mechanical center of the target housing. A coarse acquisition feature in the form of an on-target indicator is also provided.

More particularly, the vertical and horizontal sensing leads of the continuous cell are connected to respective channels in a control system including centering adjustment and automatic signal intensity variation compensation circuitry. The intensity control circuitry comprises respective preamplifier stages, each coupled to calibration potentiometers, and down-line variable gain stages utilizing intensity sensitive signal feedback for automatic gain control of the output signals. The preamp and variable gain stages utilize suitable operational amplifiers, and signals from the common lead of the cell are used to pulse width modulate a square wave that controls the duty cycle of respective switches in the feedback loops of the variable gain amplifiers. Respective centering potentiometers are connected into the variable gain stages and may be adjusted by a few simple turns prior to target use targets, specifically, their ability to define a precise point and to indicate that the laser beam is incident on that point. In the past, segmented cell targets were commonly used having four cell areas or sectors, typically quarter-circles, each separately connected electrically to produce a distinct signal in accordance with the respective quadrants of the cell plane in which the laser beam was sensed. While these targets are still useful in many applications, they are sensitive to variations in beam spot size and are being replaced by continuous cell targets that offer improved precision in applications where extreme accuracy is required. Continuous cell sensors have the capability of indicating the displacement of the position of the center of energy of the sensed beam with respect to the electrical center of the cell. However, while the continuous sensitivity of the latter targets is unaffected by spot size, it can be affected by inherent variations in laser beam intensity, as well as intensity variations due to use with optical reflectors. Also, the cell center must be carefully located within its mounting housing for accuracy, so that calibration problems are presented.

The present invention provides a system that permits the continuous cell target to be automatically calibrated, regardless of changes in laser beam intensity or spot size, and the center of the target to be electronically shifted to the exact mechanical center of the target housing, to insure that the system readout indicates precise coincidence of the laser beam with the point on which it is to fall. Additionally, a gross or coarse acquisition indication to remove centering and fixturing errors from the output signals that are read out to an appropriate computer or other display or utilization means. The common lead from the cell is also connected into a minimum power comparator circuit which will light an LED as an on-target indicator when the cell senses a sufficiently strong signal resulting from the incidence of a laser beam thereon.

A computer and improved interface may be used for readout and display, and an alternative embodiment is disclosed using these components with suitable software in lieu of external circuitry.

The system of the invention is simple in construction and easily and quickly adjustable in preparation for use. Once adjusted, a particular target system may be used continually with different and varying laser beams and optical reflectors without further calibration or adjustment by virtue of its automatic intensity control capability.

BRIEF DESCRIPTION OF THE DRAWINGS

FIG. 5 is the state listing table for the sequence counter shown in FIG. 4.

DETAILED DESCRIPTION OF THE INVENTION

Figure 1:
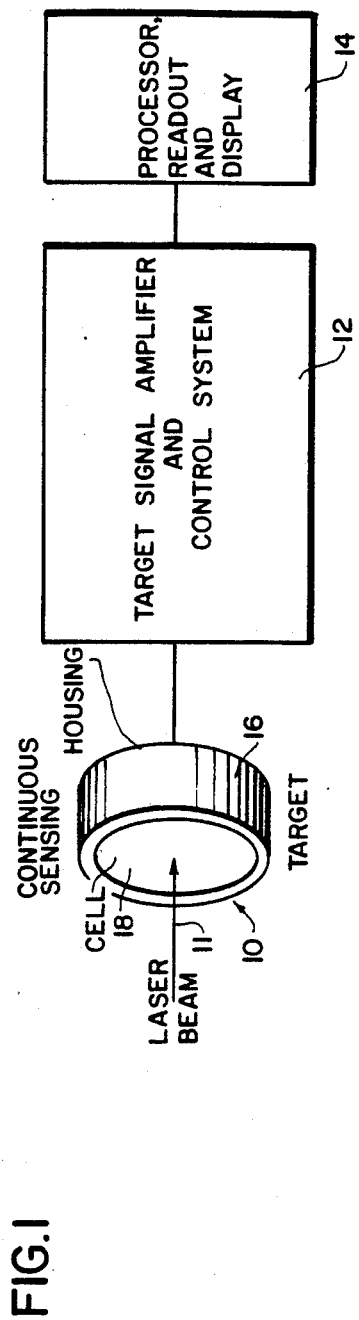
FIG. 1 is a diagrammatic illustration of a basic target and readout system in accordance with the present invention.

A basic system in accordance with the present invention is shown in FIG. 1 and comprises a target device 10 for sensing the incidence of a laser beam 11 thereon and components 12 and 14 for amplifying and controlling the resulting signals and processing them for readout and display or use.

The target device 10 is constructed of a suitable housing 16 in which is mounted a light sensing element or cell 18 that produces electrical signals in response to impingement of the laser beam 11 on its face. The function of the target in laser measurement systems is to define a point that is to be used in the measurements and to indicate when the laser beam is incident on or aligned with that point. In practice, the cell senses the displacement of the point of incidence of the optical axis of the beam on the face of the cell, from a target point which may be conveniently disposed at the center of the cell face. When the target point is coincident, or in alignment, with the point to be measured and the laser beam falls on the target point the desired measurement can be made.

With targets of this type, appropriate sensing of the center of energy on optical axis of the laser beam is effected by fluctuations and changes in the brightness and spot size that occur inherently in most laser beams and also when they are used with optical components, such as reflecting prisms and the like, during measuring. Such changes are particularly troublesome in maintaining the accuracy of measurement of segmented-type detectors, that is, those having the sensing face divided into sectors for sensing the quadrants in which the beam falls. The alternative continuous sensing type detectors are not sensitive to spot size changes so that they tend to offer more accurate off-axis or displacement information in carrying out laser measurements. However, continuous sensing type detectors are sensitive to brightness variations and normally require careful calibration to maintain their accuracy.

Figure 2:
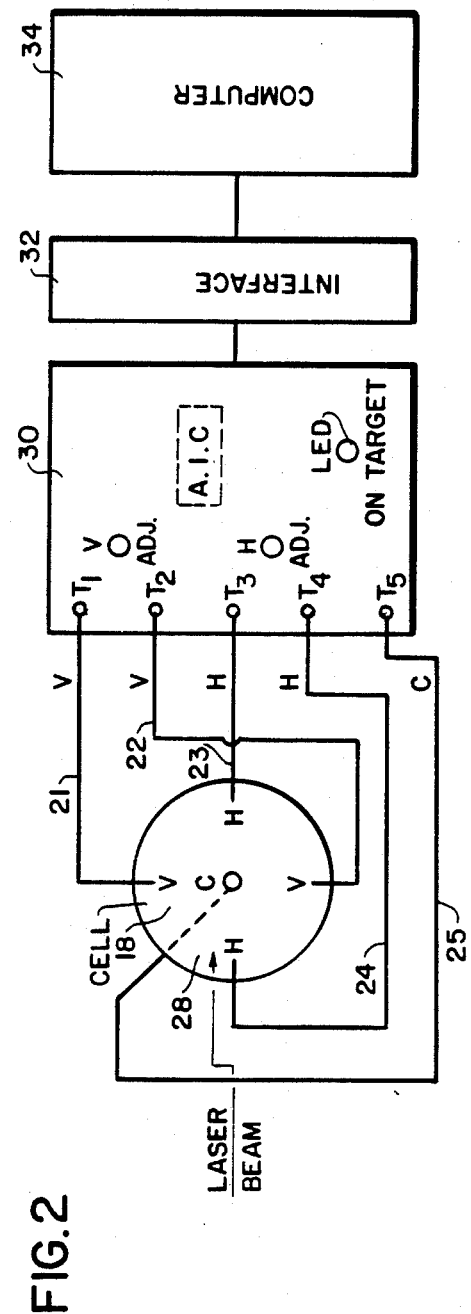
FIG. 2 is a diagrammatic illustration as in FIG. 1 showing the details of a particular embodiment of the system.

Cell 18 is of the continuous sensing type and, as seen in FIG. 2, is constructed of a sensing face 28 with four electrodes or electrical leads operatively connected thereto for transmitting electrical signals indicative of the point on the face on which a laser beam may be incident. The four leads are orthogonally arranged about the face 28 in complementary sets of two, typically one set 21, 22 for vertical position sensing and one set 23, 24 for horizontal position sensing. A fifth electrode 25 is a common lead connected approximately at the center of the rear face of the cell 18 and, with the other leads, as indicated in FIG. 1, connected at its opposite end to a suitable readout and display 14 through an appropriate amplifying and control system 12.

Heretofore, it has been necessary when setting up a laser measurement system for use to carefully calibrate the control system to adapt it for optimum performance with the laser and target combination involved. Consequently, careful and precise adjustments had to be made on the system in the field, frequently under adverse conditions. As a result, the need for careful and repeated adjustments and calibration of these amplification and control systems has been a constant problem in the laser measurement art.

A preferred embodiment of the present invention solves this problem by providing an automatic intensity control system that compensates for variations, in the signal due to laser beam intensity variations and additionally incorporates means in the system for electronically centering the cell target point within the housing, so that repeated recalibration is obviated once the system is initially adjusted to the target to be used in combination with it. The preferred embodiment is shown diagrammatically in FIG. 2 and involves a component 30 to which the five leads 21–25 of the cell 18 are connected at respective terminals $T_1$–$T_5$, and a computer 34 to which the sensed signals are communicated from component 30 through an improved interface 32. The computer 34 provides a display or other readout precisely indicative of the target cell's acquisition of the laser beam. A means may also be provided in the component 30 to give a coarse indication as to whether or not the beam is intersecting the target at any point on its face.

Figure 3A:
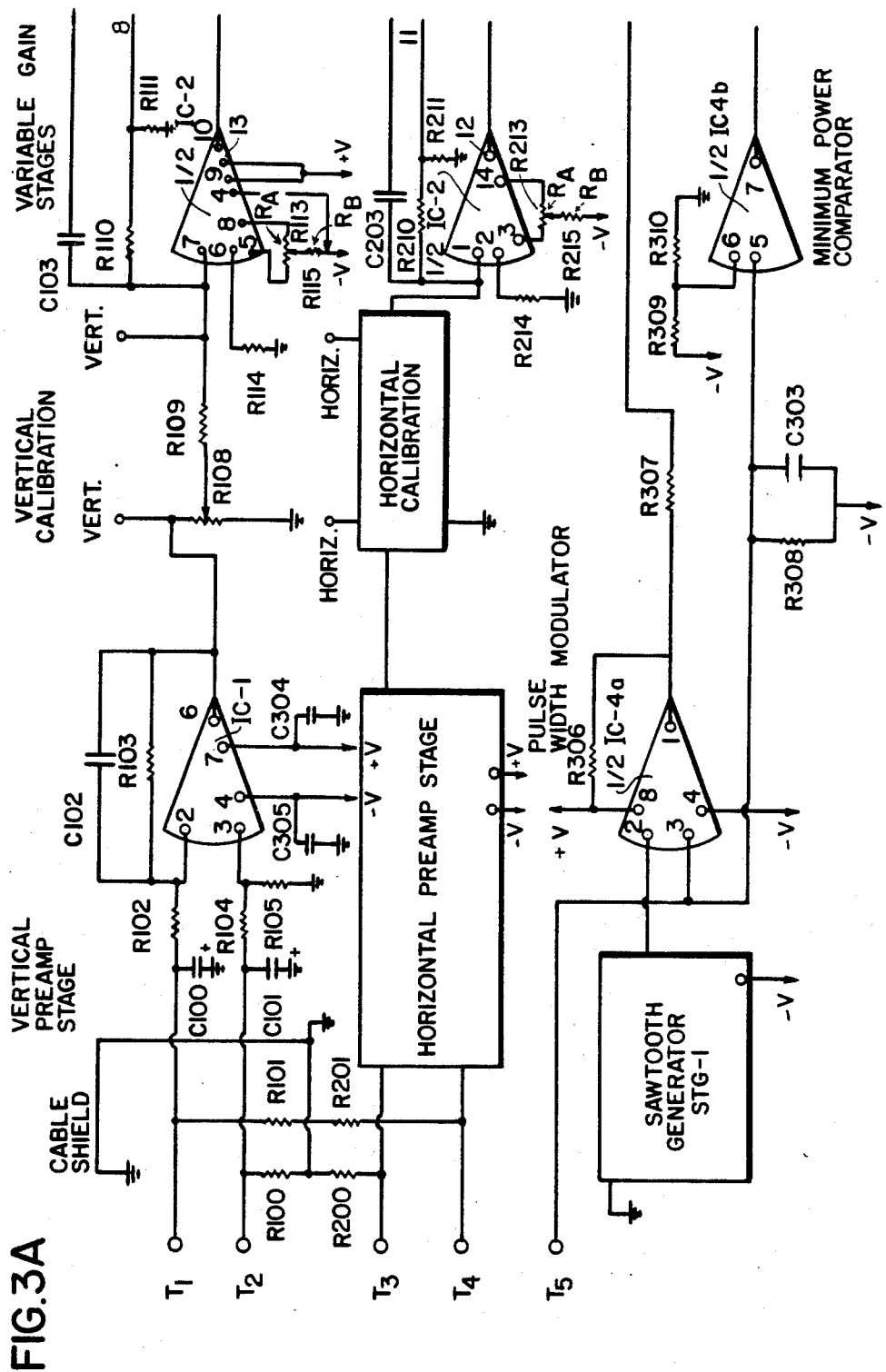
FIGS. 3A and 3B form a schematic diagram illustrating a preferred embodiment of the signal intensity and centering control unit of FIG. 2.
Figure 3B:
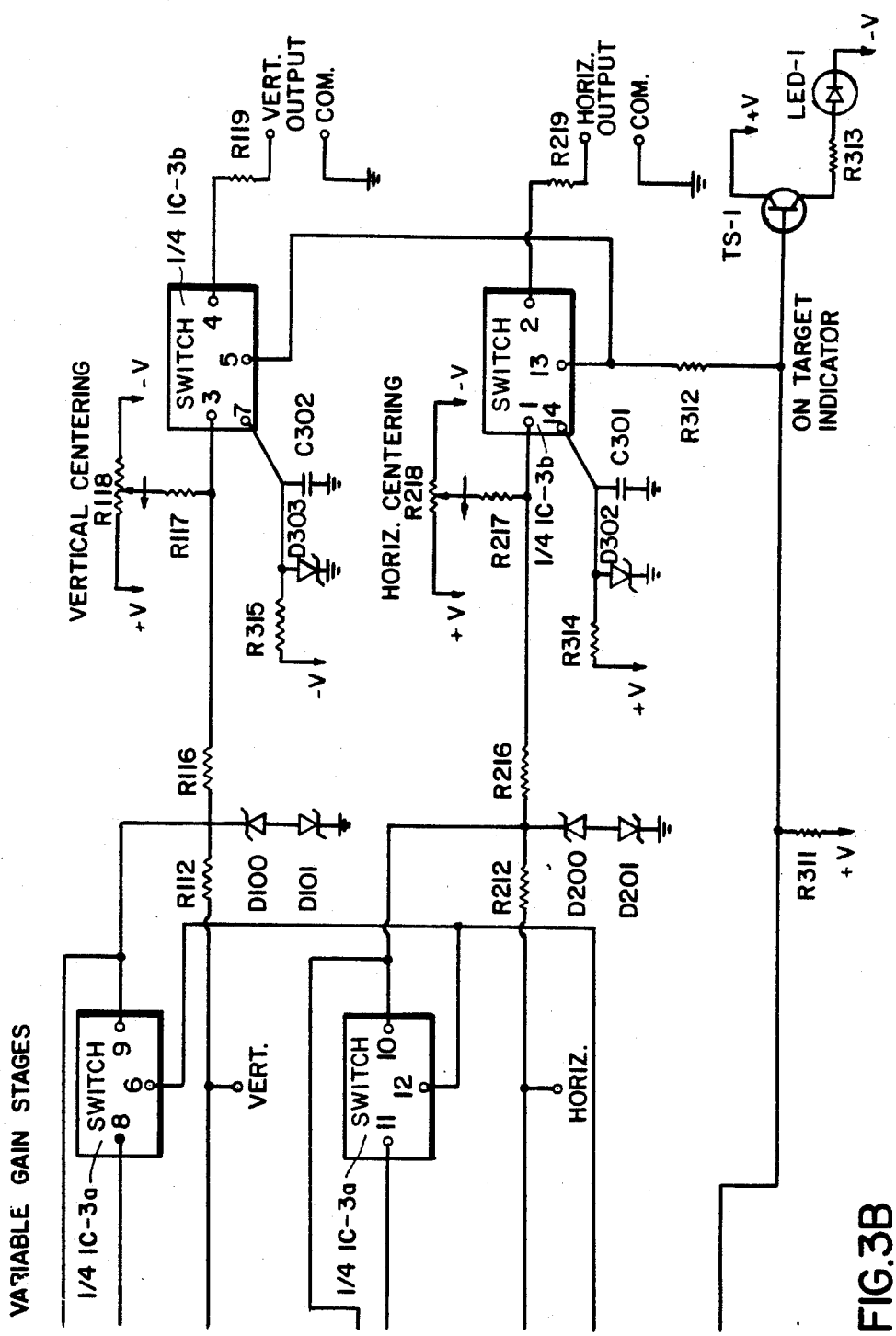

More particularly, the component 30 preferably contains the circuitry shown in FIGS. 3A and 3B wherein it will be seen that the signals from vertical sensing leads 21, 22 are coupled through terminals $T_1$, $T_2$ to the input terminals of an operational amplifier IC-1 which acts as a differential amplifier. The input voltages from the two leads are indicative of the displacement of the point of incidence of the laser beam on the cell face from the electrical center. One of the inputs to amplifier IC-1 is inverted so that its polarity becomes opposite to that of the other input and thus the inputs are subtracted from each other while being amplified. Consequently, if the voltages are equal, indicating that the beam position is equidistant from the respective electrodes 21, 22 on the cell face 28, they will cancel each other and a null signal will result at the output of the amplifier IC-1. When the voltages are of different magnitudes an appropriate positive or negative voltage will result in accordance with a preselected polarity indicating off-center incidence in a particular direction.

Horizontal terminals $T_3$ and $T_4$ are connected to an identical operational amplifier and in the same manner so that parallel channels are set up for amplifying and processing the veritcal and horizontal signals from the target cell 18. The outputs from the preamp stages of these channels are then fed to respective calibrating potentiometers, such as $R_{108}$, which are set to provide an appropriate level of input signal to the remainder of the control system. Since, in addition to the position of the laser beam on the cell face, the levels of the sensed signals are effected by changes in the intensity of the beam, these calibrating potentiometers could require repeated readjustment at different times and in different applications. The remainder of the system is designed to obviate such readjustments.

To this end, the output signal from each calibrating potentiometer is fed to a variable gain stage including an amplifier, IC-2, with feedback loops controlled by a signal input from the common lead 25 through terminal $T_5$. The current from the common lead 25 controls an amplifier IC-4a which pulse width modulates a square wave resulting from the output of a saw tooth generator STG-1. The resulting square wave is fed to a pair of electronic switches IC-3a disposed in the feedback loops of the amplifiers IC-2. The switches IC-3a are connected so as to close in the presence of an input signal and to open in the absence of a signal. The duty cycle of the square wave is modulated so as to be proportional to the magnitude of the signal from terminal $T_5$. Consequently, when the signal is strong, indicating that the beam is of high intensity, the duty cycle will be lengthened resulting in a large feedback signal which will decrease and moderate the outputs of amplifiers IC-2. Conversely, when the signal from the common lead drops, the square wave duty cycle decreases, opening switches IC-3a for a longer period and thus permitting the gain of amplifiers IC-2 to increase and maintain the output signals at a desired level. Hence the vertical and horizontal channel output signals remain indicative of the displacement of the laser beam position from the electrical center of the target face but become insensitive to variations in the intensity of the beam.

Circuitry for electrically correcting for displacement of the electrical or sensing center of the sensing cell from the mechanical or geometric center of the target mounting housing 16 is also provided at the output of the variable gain stages in the form of the potentiometers $R_{118}$, $R_{218}$. These zero adjustment potentiometers are used to sum a positive or negative voltage with the amplified output voltage in each channel to electrically displace the sensing center of the cell ten or twenty thousandths of an inch within the housing 16 in order to correct for fixturing errors. For example, in the case where a measuring target is mounted on a spindle with an axis of rotation, although a null point may be achieved by directing the laser beam onto the center of the sensing cell when the latter is first fixed in position, still rotation of the target may reveal, by off center displacement of the beam, that the beam is not precisely coincident with the axis of rotation. This error may be mechanically corrected as in the past by physically adjusting the cell 18 within its mounting 16 to produce coincidence of the sensing and rotational centers, but more easily a slight turn of the potentiometers $R_{118}$, $R_{218}$ can be used to electrically move the sensing center to eliminate the displacement error. Once this adjustment has been made and the target fixed, the system is ready to provide an accurate and continuous output, in the form of a steady DC signal or a null, indicative of the precise position of incidence of the laser beam with respect to the geometric center of the target, and ready for supplying to a readout device.

In the event that no laser beam is incident on the target it is desirable that no stray voltages, or center correcting voltages, be output to the readout device. To achieve this end a coarse acquisition system is included in the control circuitry in the form of a voltage comparator leg comprising amplifier IC-4, a second set of switches IC-3b, transistor TS-1 and light emitting diode LED-1. When the input signal from common terminal $T_5$ is of such a magnitude that the presence of an incident laser beam is indicated and its position is to be measured, the output of comparator amplifier IC-4b, will switch on the two IC-3b switches in the system output lines so that the appropriate displacement signals from the variable gain stages will be permitted to pass through resistors $R_{119}$, $R_{219}$ to the output terminals. At the same time transistor TS-1 is switched on causing the diode LED-1 to emit light indicating the beam is on the target. Conversely, if no beam is striking the target, an insufficient signal will be supplied to comparator amplifier IC-4b, resulting in its shut-off and the attendant opening of switches IC-3b and shut-off of transistor TS-1 and diode LED-1. The combination of no output signals from the amplifier channels due to the open switches IC-3 and the shut-off of diode LED-1 indicates a lack of beam acquisition by the target.

It will be seen that resistors R314, R315, diodes D302, 303, and capacitors C301, C302 are used to control the connections of the operating voltages +V and −V to the switch circuits IC-3b.

By way of example, a suitable combination of components and values for the amplifiers, switches, diodes, resistors, capacitors, etc. shown in FIG. 3 with an operating voltage V=35 15 volts, are as follows:

| COMPONENT | TYPE | RA | RB |
|---|---|---|---|
| IC-1 | 0P07CJ | | |
| IC-2 | CA3240AE1 | 20K | 20K |
| | CA083AE or BE | 20K | 4.7K |
| | LF354AN or BN | 10K | 4.7K |
| | TL083IP or ACP | 100K | 10K |
| IC-3a,b | 4066 | | |
| IC-4a,b | LM393 | | |
| D100,101 | IN752A | | |
| D200,201 | IN752A | | |
| D302,303 | IN756A | | |
| TS-1 | MPS-A14 | | |

-continued

| RESISTOR | Value (Ω) | RESISTOR | Value (Ω) |
|---|---|---|---|
| R100,201 | 1.5K 1% | R116,216 | 2K 1% |
| R101,200 | 1.63K 1% | R117,217 | 100K 1% |
| R103,105 | 500K 1% | R118,218 | 20K |
| R102,104 | 18.2K 1% | R119,219 | 10K |
| R108 | 20K | R306,311 | 10K |
| R109 | 681K 1% | R307 | 100K |
| R110,210 | 250K % | R308 | 10K 1% |
| R111,211 | 15K | R309 | .525K 1% |
| R112,212 | 2K | R310 | 20K |
| R113,213 | RA | R312 | 560K |
| R114,214 | 300K | R313 | 1.8K |
| R115,215 | RB | R314,315 | 1.2K |

| CAPACITOR | VALUE (μf) |
|---|---|
| C100,101 | 4.7 |
| C102 | .05 |
| C103,203 | .15 |
| C301,302 | .10 |
| C303 | .01 |
| C304,305 | 4.7 |

As explained above, the output of the signal intensity and centering control system will be in the form of positive or negative voltages indicative of the position of incidence of a laser beam in the plane of the sensing cell face, that is, proportional to the displacement of that position from the electrical center of the face. Of course, when the beam is precisely centered a zero or null output will result. In order for the system output to be useful it must be coupled to some form of readout device for display or recording. While many devices may be found suitable for the readout function, such as digital voltmeters or panel meters, a preferred embodiment comprises a general purpose computer with an appropriate interface as will now be described.

Preferably, the interface or data acquisition subsystem is to the type which operates according to the RS-232 protocol powered by a ±15 volt power source and generally comprises: an input multiplexer for serially selecting or switching the signals input thereto from the various channels of the intensity and centering control system; an analog-to-digital converter for converting each signal from the multiplexer into binary coded decimal (BCD) digital form; and a universal asynchronous receiver/transmitter (UART) communications chip which reads the digitized signals one digit at a time, stores them and then transmits them serially to the computer, i.e., one digit at a time. The computer is programmed to send out signals to control the channel selection and each channel provides six-bits of information to the computer indicative of the sign, decimal location, and magnitude of the input voltage. The BCD formatting permits the information data to be used directly in commonly employed high level language routines, and thus in microcomputers of the type intended as personal computers. Consequently, while computer 34 may be of any suitable size, the system of the invention is readily adaptible to use with a microcomputer. Also, while a serial interface is preferred, a parallel interface may be used by substituting data latches for the UART and appropriate associated logic for parallel implementation.

Figure 4:
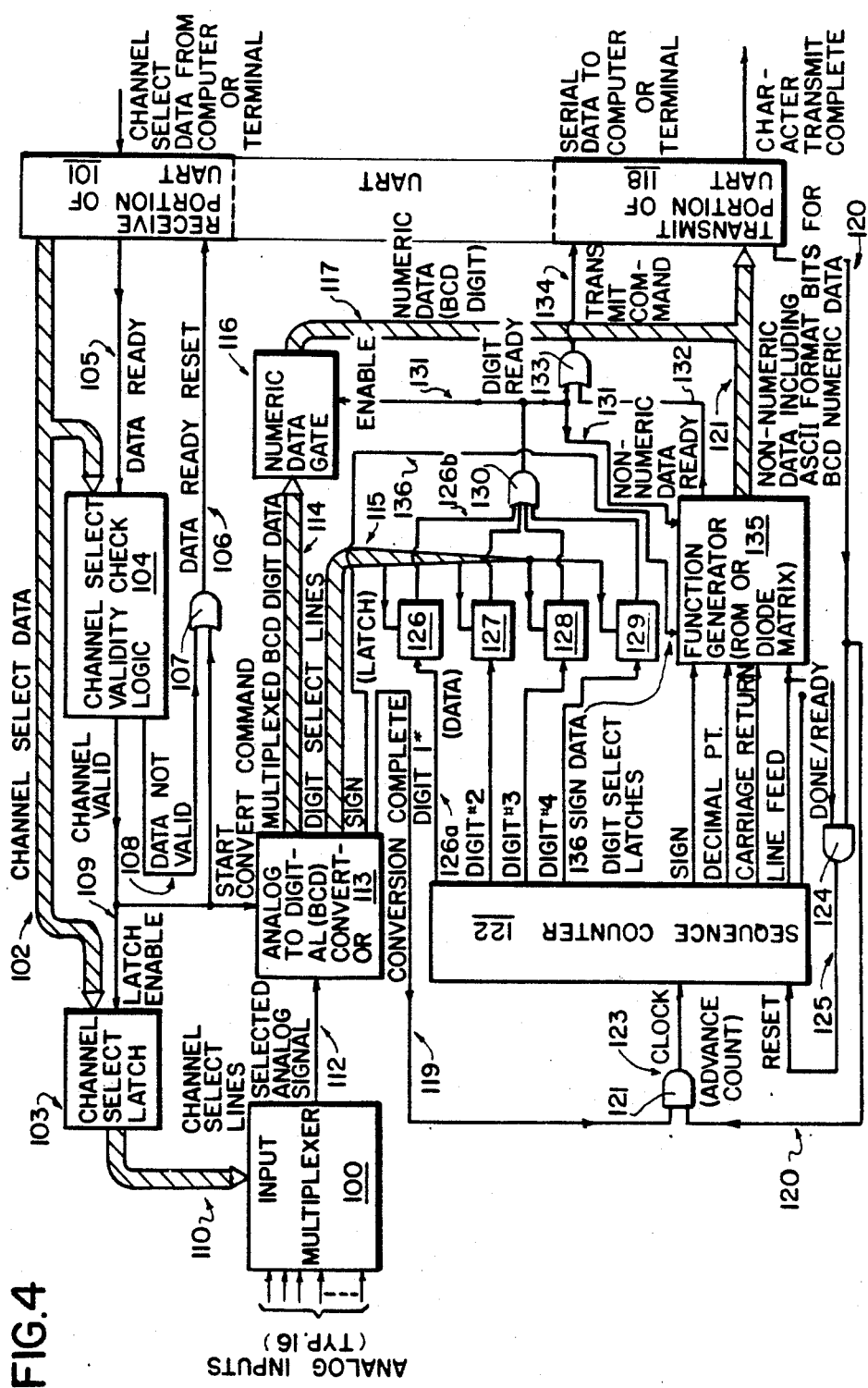
FIG. 4 is a schematic diagram illustrating a preferred embodiment of the interface of FIG. 2.

As seen more specifically in FIG. 4, the input multiplexer 100 of the interface 32 receives the outputs from one or more target signal amplifier and control systems 12. Each control system 12 will have a vertical and horizontal signal output channel and the multiplexer may be capable of handling 16 channels, i.e, inputs from eight different targets 10. Serial selection of the input signals received by multiplexer 100 is conducted under the control of the program within the computer 34 through the receive portion 101 of the UART communications chip. The computer 34, by design of software, initiates a cycle acquisition by transmitting a channel select character to the interface. With multiplexer 100, 16 such characters can be accommodated as a maximum of 16 discrete analog input channels are provided. The channel select characters are preferably standard ASCII characters and further are selected from one column of the standard ASCII table, each column being comprised of 16 characters. It is to be understood, however, that the 16 character and 16 channel system described constitutes a preferred implementation for the task for which the subsystem is intended and adaptation to accommodate any practical number of channels lies within the capabilities of those skilled in the art and the scope and the spirit of the present invention.

The serial data formatting for computer communications is implemented with a standard integrated circuit designed for the purpose known to those skilled in the art as a UART or universal asynchronous receiver and indicated by the large block on the right of FIG. 4. The channel select character from the computer 34 is received by that portion of the UART intended for the purpose designated as section 101 in FIG. 4. The channel select data is then presented in a parallel form on bus 102. The UART also provides a signal indicating that the parallel data is ready, over a wire 105. Both the channel select data and the data ready signal are routed to a channel select validity check logic block 104 which examines the data and determines whether it in fact corresponds to a valid channel select character. In the event that the outcome of that comparison is false, a logical signal of true state appears at line 108, is transmitted through an OR gate 107 and resets the UART "data ready" input via a connection made by wire 106. This feature is useful for masking characters such as "carriage return" and "line feed" commands which, although standardly generated by the computer, are not usable for channel selection purposes.

Assuming that data corresponding to a valid channel selection is received by logic block 104, a logical true signal appears at the connection indicated as wire 109. A number of actions take place as a result. Channel select latch 103 captures the channel select data patterns on bus 102 via the latch enable command received from wire 109. Also the "data ready" signal developed by the UART is reset via OR gate 107 in a fashion similar to that stated above. It will be understood in this regard, and later in similar instances, by those skilled in the art, that time delay functions not here shown are provided where necessary to meet set-up time requirements and propagation delay requirements for the integrated circuits utilized. One such time delay would in fact be utilized at the output of OR gate 107 so as to permit acquisition of channel select data by channel select latch 103 before such data disappeared from bus 102 as a result of a reset signal applied to the receiver portion 101 of the UART.

The channel select data is transferred from latch 103 via bus 110 to input multiplexer 100. The multiplexer 100 selects (in the preferred implementation) one of 16 analog inputs for transmission to an analog to digital converter 113 via wire 112. It will be further understood both here and in other instances that use of a common or ground return for signal and data communication is utilized although not explicitly shown. Input multiplexer 100 may be comprised of CMOS analog switch integrated circuitry, reed relays, or other suitable hardware known to the art.

As each of the channels is selected the analog voltage output is fed to converter 113 to be converted to BCD form. Wire 109 admitting of a true channel select signal is also routed to analog to digital converter 113 and serves to initiate the conversion cycle, generating the BCD counterpart of the selected analog input voltage level. It is to be pointed out here that certain commercially available analog to digital converter integrated circuits, such as the Intersil ICL-7135, which is preferred in this embodiment, do not start the conversion process immediately upon receipt of the start conversion command. An automatic zeroing subcylce takes place first, which allows sufficient settling time through the input multiplexer for the selected analog signal.

When BCD digital conversion is complete, a logical true signal appears at wire 119 indicating so. The transmit portion 118 of the UART also provides a logical true signal at wire 120 as transmission of the previous character has been completed. In alternative methods of implementation it will be understood that the UART output to wire 120 need not be a constant signal but could instead be presented as a state change or clock signal, and details of circuitry dependent upon that signal would be changed accordingly for utilization of the different signal format. In the preferred implementation shown, however, a situation will arise when analog to digital conversion is complete, whereupon both inputs to AND gate 121 will be logically true. A logical true signal therefore appears at wire 123 advancing a sequence counter 122 by one step. By reference to the sequence counter state shown in FIG. 5, it will be seen that the counter state now under consideration enables transmission of the "sign" character. To that extent a wire 136 containing "sign" information is provided for transferring a "sign" bit from converter 113 to a function generator 135 which may be in the form of a ROM or diode matrix. The function of the generator 135 is the generation of ASCII characters or codes for non-digit information to be transmitted, namely, sign, decimal point, carriage return and line feed signals. Function generator 135 also supplies several bits necessary to format BCD data into ASCII characters, as will be discussed more fully below. As the "sign" input of function generator 135 is enabled, and as sign information is provided from converter 113 via wire 135, an ASCII character corresponding to a plus or minus sign is developed by function generator 135 and appears in parallel form on bus 121. Also a logical true signal appears at wire 132 indicative of nonnumeric data generated by function generator 135 being ready for acquisition by the transmit portion 118 of UART. It is to be understood that portions 101 and 118 of FIG. 4 are preferably contained within the same integrated circuit and are shown with separate designators merely for the sake of clarity of illustration. The logical true signal appearing on wire 132 causes the output of OR gate 133 to also be true, in turn causing the transmit portion 118 of the UART to send one character (the "sign" character) to the computer 34. The transmit command is carried from OR gate 133 to UART portion 118 via wire 134. During this transmission the "character transmit complete" signal output from portion 118, on wire 120, assumes a logically false condition removing the clock or advance count signal from sequence counter 122 by removal of the true input to AND gate 121. When character transmission is complete, wire 120 again assumes a logically true condition as a function of logic internal to UART portion 118, and gate 121 then produces a logical true signal on wire 123 advancing sequence counter 122 to the next state, state 2. Transmission of a "decimal point" function then takes place in a manner similar to that described for transmission of the "sign" function, except that function, generator 135 needs no conditional input for "decimal point" generation as the constitution of a decimal point is invariant, no conditional considerations being applicable as with generation of a "sign" character. The sequence counter 122 is then advanced to state 3 requiring transmission of the most significant digit of data generated by analog to digital converter 113.

Analog to digital converters of the type providing BCD data formatting usually present such data in multiplexed form. Accordingly, data for all digits is presented in time-shared fashion over the lines in one bus 114, while digit select lines or outputs are contained in another bus 115. Each of the several lines comprising bus 115 becomes logically true when digit data on bus 114 corresponds to the digit the line is to indicate by being logically true. Synchronization means are therefore required to affect demultiplexing of the subject digit data, and for reformatting for digit by digit transmission to UART portion 118, on a basis independent of the digit select repetition rate inherent in the output of analog to digital converter 113. Digit select latches 126 through 129 are utilized for that purpose. The digit select latches may be D type flip-flops, or they may be implemented by other suitable logic means. When the information for "digit #1" is to be transmitted, a logical true signal appears at wire 125a generated by sequence counter 122 in a manner similar to that described above. Each of the digit select lines contained within bus 115 serves to cause latching of the correspondingly correct sequence counter output via digit select latches 126 through 129. In the case of digit #1, the output of digit select latch 126, on wire 126b, assumes a logically true state when the above condition is met, i.e., line 126b becomes true when digit #1 is selected by analog to digital converter 113 after sequence counter 122 has progressed to the state, state 3, where transmission of digit #1 is the next required action.

The output of OR gate 130, on wire 131, also becomes true as a result of the input from wire 126b being true. A number of actions occur as a result. Firstly, numeric data gate 116 becomes active providing the BCD portion of the desired ASCII character (corresponding of course to the digit to be transmitted) on bus 117. Wire 131 also provides function generator 135 with a signal indicative of the fact that a numeric character is about to be transmitted. Correspondingly, function generator 135 provides the additional ASCII-bits required to be transmitted with BCD data for recognition as an ASCII character. In that regard busses 117 and 121 may both be considered to be wire OR'ed, and may be considered to be mutually exclusive, only for the purposes of numeric digit transmission in ASCII code, as will be seen from a consideration of FIG. 4.

Advancement of sequence counter 122 through the remaining states shown in the state listing in FIG. 5 takes place after transmission of each digit in a manner similar to that described above. Following transmission of "digit #4", "carriage return" and "line feed" characters are transmitted, after generation by function generator 135, in a manner identical with that utilized for transmission of the "sign" and "decimal point" data. Although the "line feed" enable output of sequence counter 122 is shown unconditionally connected to function generator 135, transmission of a "line feed" character may be considered as optional depending upon the requirements of the specific computer utilized. Following transmission of the final character, be it a "carriage return" or "line feed", character sequence counter 122 is reset via a logical true signal applied by AND gate 124 to wire 125. The inputs to AND gate 124 are those admitting of the combination of conditions indicative of a given subsystem cycle having been completed, i.e., enabling of the final function of the sequence counter 122 in conjunction with transmission of the character corresponding to that function having been completed. In that regard the "line feed" enable output (the option of "line feed" not being proved notwithstanding) of sequence counter 122 feeds one input of AND gate 124 and the other input is fed by wire 120 with the character transmit complete signal from the transmit portion 118 of the UART. Sequence counter 122 is therefore reset to the initial state shown as count state 0 in the state listing table. The entire data acquisition subsystem is then ready to receive a new channel select character and when a character is received the entire cycle begins again.

With the improved interface 23, an alternative embodiment of the invention is contemplated wherein the intensity and centering functions of control component 30 are transferred to computer 34 and carried out in the computer by means of a suitable program. In this embodiment the sensed signals are merely amplified before being sampled by interface 32, which operations may take place for example, within the system component 12 shown in FIG. 1. The sampled signals are then fed from the interface 32 portion of component 12 in converted form for processing and readout in component 14 which may comprise computer 34. The program in this embodiment in addition to providing the appropriate channel select signals to interface 32 will also contain means, responsive to the changes in the level of the signal from the detector cell common lead, for compensating for intensity variations in the position indicative signal levels, and for adding corrective increments to the latter signals to compensate for centering errors.

In either system embodiment the ultimate readout may take the form of a digital or graphic display or any form of printout or other suitable utilization as desired.

It will accordingly be seen that the present invention provides a comparatively simple and advantageous system for utilizing the output signals from a continuous sensing detector cell in a laser measurement system by means of which the need for calibration adjustments is minimized during continual use.

I claim:

1. In a measuring system utilizing a laser beam for determining the position of a given point, the combination comprising:
   target means, having a continuous sensing detector cell defining said given point, for sensing the position of incidence of a laser beam thereon and producing signals indicative of said position, said detector cell comprising:
   a sensing face;
   at least one pair of diametrically opposed electrode means operatively connected to said sensing face for providing a voltage signal indicative of the displacement of the position of incidence of said laser beam on said sensing face from said respective electrode means;
a rear face; and
a common electrode operatively connected to said rear face;
means, operatively connected to said target means, for amplifying said indicative signals and comprising a first operational amplifier means operatively connected to said diametrically opposed electrode means for differentially amplifying said displacement indicative voltage signal;
means, operatively connected to said amplifying means, for automatically maintaining the level of said amplified indicative signals irrespective of variations in the intensity level of said laser beam and comprising:
  a second operational amplifier means, operatively coupled to the output of said first operational amplifier means, for amplifying the output voltage signal;
  a feedback loop operatively connected across said second operational amplifier means and comprising first switch means for opening and closing said feedback loop; and
  means, operatively coupled to said common electrode, for controlling the opening and closing of said first switch means; and
means, operatively connected to said maintaining means, for processing and reading out said amplified indicative signals to provide an indication of the position of incidence of said laser beam with respect to said given point.

2. A system as in claim 1 further comprising means operatively coupled to the output of said second operational amplifier means for modifying the output thereof to electrically move said given point on said sensing face.

3. A system as in claim 1 further comprising means for producing an indication signal in response to a signal from said common electrode when a laser beam is incident on said sensing face.

4. A system as in claim 3 further comprising means responsive to said indication signal for producing a light signal.

5. A system as in claim 3 further comprising second switch means operatively coupled to the output of said second operational amplifier for cutting off said indicative signals to said means for processing and reading out in the absence of said indication signal.

6. A system as in claim 1 wherein said processing and reading out means comprises a computer and interface means for digitizing said indicative signals for input to said computer.

7. A system as in claim 6 wherein said computer further comprises means for modifying said digitized signals to mathematically move said given point on said sensing face.

* * * * *